(12) United States Patent
Sarajian

(10) Patent No.: US 8,444,013 B2
(45) Date of Patent: May 21, 2013

(54) FOOD TOPPING DEVICE INCLUDING A VIBRATION DEVICE AND ADJUSTABLE DISCHARGE PAN AND SCREEN ASSEMBLY

(75) Inventor: Ty Sarajian, Oconomowoc, WI (US)

(73) Assignee: Axis Automation, LLC, Hartland, WI (US)

( * ) Notice: Subject to any disclaimer, the term of this patent is extended or adjusted under 35 U.S.C. 154(b) by 243 days.

(21) Appl. No.: 12/846,914

(22) Filed: Jul. 30, 2010

(65) Prior Publication Data

US 2011/0024446 A1 Feb. 3, 2011

Related U.S. Application Data

(60) Provisional application No. 61/230,831, filed on Aug. 3, 2009.

(51) Int. Cl.
*B67D 7/76* (2010.01)
*B65D 88/66* (2006.01)

(52) U.S. Cl.
USPC .......... 222/1; 222/189.03; 222/196; 222/200; 222/228; 222/185.1; 222/290

(58) Field of Classification Search
USPC ................ 222/181.1, 185.1, 189.02, 189.03, 222/189.05, 196, 197, 199, 200, 216, 217, 222/226, 228, 282, 285, 290, 404, 408, 437, 222/457, 476, 565, 1; 198/530, 532, 533, 198/534; 366/108; 401/4; 426/289, 519
See application file for complete search history.

(56) References Cited

U.S. PATENT DOCUMENTS

| | | | | |
|---|---|---|---|---|
| 269,850 A * | 1/1883 | Hadden | .......................... | 222/200 |
| 1,014,383 A * | 1/1912 | Frazee | .......................... | 241/224 |
| 1,554,071 A * | 9/1925 | Downs | .......................... | 222/196 |
| 2,692,705 A * | 10/1954 | Marihart | .......................... | 222/313 |
| 2,967,056 A * | 1/1961 | D'Amato | .......................... | 239/657 |
| 3,162,300 A * | 12/1964 | Sensenig | .......................... | 198/497 |
| 4,363,589 A * | 12/1982 | Rozwadowski et al. | ...... | 414/415 |
| 4,475,671 A * | 10/1984 | McCorkel | .......................... | 222/196 |
| 4,498,635 A * | 2/1985 | Fielding | .......................... | 241/94 |
| 4,502,615 A * | 3/1985 | Stangl | .......................... | 222/199 |
| 4,576,209 A * | 3/1986 | Eisenberg | .......................... | 141/1 |
| 5,090,593 A * | 2/1992 | Ejike | .......................... | 222/1 |

* cited by examiner

*Primary Examiner* — Kevin P Shaver
*Assistant Examiner* — Patrick M Buechner
(74) *Attorney, Agent, or Firm* — Andrus, Sceales, Starke & Sawall, LLP

(57) ABSTRACT

A food topping device for dispensing a food toppings. The food topping device includes a hopper that receives a food topping. The hopper directs the supply of the food topping onto the base plate of a discharge pan. The angle of the discharge pan relative to horizontal can be selectively adjusted. A vibration device is coupled to the discharge pan. When the vibration device is activated, the vibration of the discharge pan helps the food topping to overcome the angle of repose and flow down the base plate toward a discharge end. A screen positioned at the discharge end of the discharge pan further controls the flow of food topping from the device. The angle of the screen can be adjusted to control the discharge rate. A flow plate is positioned between the hopper and the discharge end to further control the amount of topping reaching the discharge end.

17 Claims, 4 Drawing Sheets

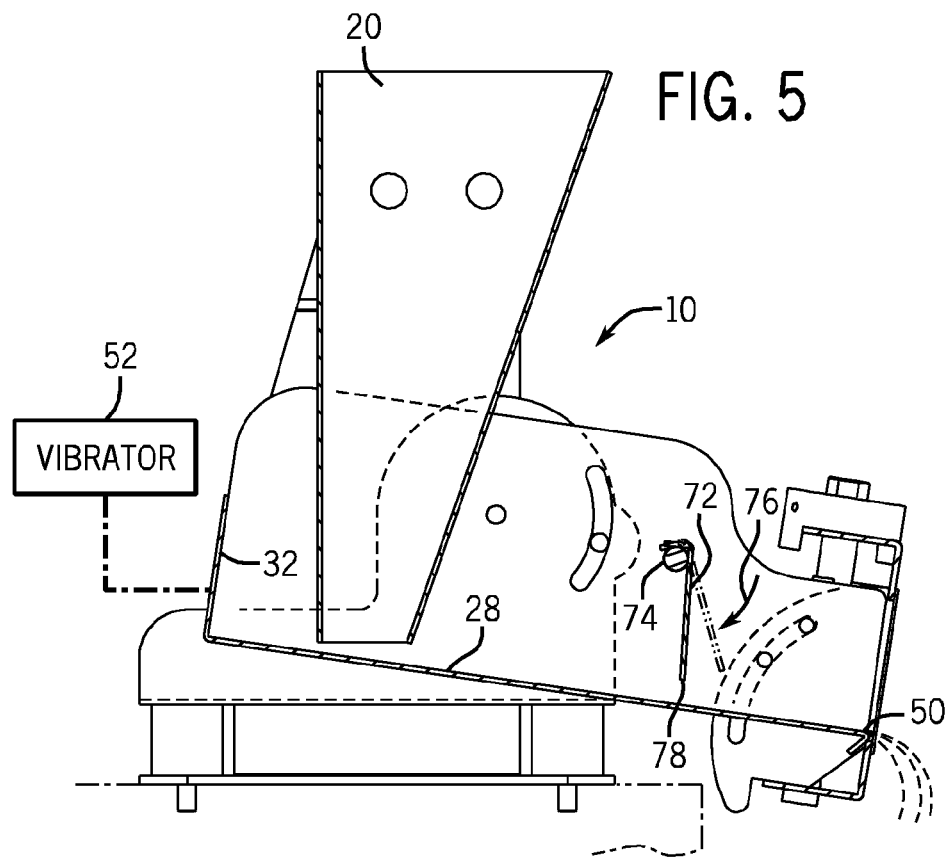
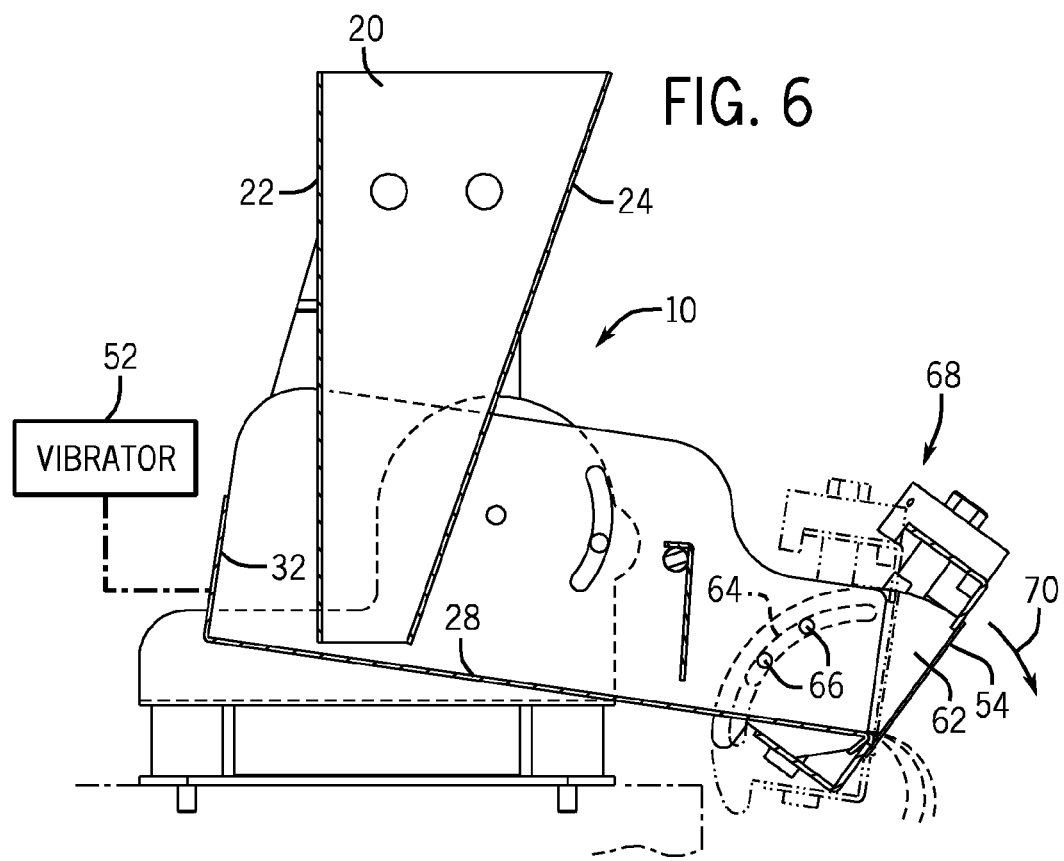

FOOD TOPPING DEVICE INCLUDING A VIBRATION DEVICE AND ADJUSTABLE DISCHARGE PAN AND SCREEN ASSEMBLY

CROSS-REFERENCE TO RELATED APPLICATION

The present application is based on and claims priority to U.S. Provisional Patent Application Ser. No. 61/230,831 filed on Aug. 3, 2009.

BACKGROUND OF THE INVENTION

The present disclosure generally relates to a device for dispensing a food topping onto a food product. More specifically, the present disclosure relates to a food topping device that can control the dispensing rate of the food topping in a controlled and consistent manner.

Presently, many different food products are topped with a food topping, such as powdered sugar, flour or granulated sugar. Typically, a continuous stream of food products pass beneath a food topping device which continuously dispenses the food topping onto the individual food products. Although devices currently exist to dispense food toppings onto the stream of products, these devices typically have very limited control of the rate of dispensing and are unable to accurately dispense and terminate the dispensing of the food topping onto the food product. Therefore, a need exists for a food topping device that can accurately control the dispensing of the food topping onto the food product.

SUMMARY OF THE INVENTION

The present disclosure relates to a device for dispensing a food topping onto a food product. More specifically, the food topping device is operable to selectively control the dispensing of the food topping onto food products.

The food topping device includes a hopper that has an open interior sized to receive a supply of the food topping to be dispensed onto the food products. The hopper extends between an upper end and a lower discharge opening. The discharge opening of the hopper is positioned slightly above a discharge pan that extends between a discharge end and a back end. The discharge pan includes a generally planar base plate that extends between the back end and the discharge end. When the hopper is filled with the food topping, the food topping falls onto the discharge pan between the discharge end and the back end.

In one embodiment, the discharge pan is pivotally mounted to a stationary mounting bracket assembly such that the incline angle of the discharge pan relative to horizontal can be adjusted. Alternatively, the angle of the discharge pan could be fixed at a preferred incline angle.

When the hopper is filled with the food topping, the food topping falls onto the discharge pan. When the base surface of the discharge pan is horizontal, the food topping does not flow toward the dispensing end. As the incline angle of the discharge pan increases, the food topping will begin to flow toward the discharge end when the incline angle reaches the angle of repose for the food topping, based on the surface condition of the discharge pan.

The food topping device further includes a vibration device that is positioned in contact with the discharge pan. When the vibration device is activated, the vibration device causes the discharge pan to vibrate. The vibration of the discharge pan causes the food topping deposited onto the base plate of the discharge pan to begin to flow toward the discharge end. If the incline angle of the discharge pan is less than the angle of repose for the food topping, the food topping will flow toward the discharge end of the discharge pan only when the vibration device is operating and vibrating the discharge pan. In this manner, the operation of the vibration device controls the dispensing of the food topping from the discharge end of the discharge pan.

The food topping device can also include a flow plate that is positioned between the hopper and the discharge end of the discharge pan. The flow plate includes a lower end that is spaced above the base plate to control the thickness of the food topping that can flow past the flow plate. The angle of the flow plate is adjustable to vary the distance between the lower end of the flow plate and the base plate to thereby control the thickness of the food topping that flows past the flow plate.

The food topping device can also include a screen assembly positioned at the discharge end of the discharge pan. The screen assembly includes a screen that extends across the width of the discharge pan at the discharge end. The screen includes a series of openings that allow the food topping to flow through the screen. In one embodiment, the angle of the screen assembly relative to the base plate of the discharge pan can be adjusted. When the angle of the screen is adjusted, a varying amount of food topping can flow through the screen and onto the food product. In a contemplated embodiment, the angle of the screen assembly relative to the base plate of the discharge pan can be fixed. Preferably, the angle of the screen assembly relative to the base plate will be greater than 90°. The screen can be selected having different patterns or size openings depending upon the specific food topping pattern desired on the food product. The angle of the screen assembly can be adjusted independently of the angle of the discharge pan to further control the rate of deposit of the food topping onto the food product.

Various other features, objects and advantages of the invention will be made apparent from the following description taken together with the drawings.

BRIEF DESCRIPTION OF THE DRAWINGS

The drawings illustrate the best mode presently contemplated of carrying out the invention. In the drawings:

FIG. 5 is a section view illustrating the movement of the flow plate between various dispensing positions; and FIG. 6 is a section view illustrating the pivoting movement of the front screen from the home position shown in FIG. 3.

DETAILED DESCRIPTION OF THE INVENTION

Figure 1:
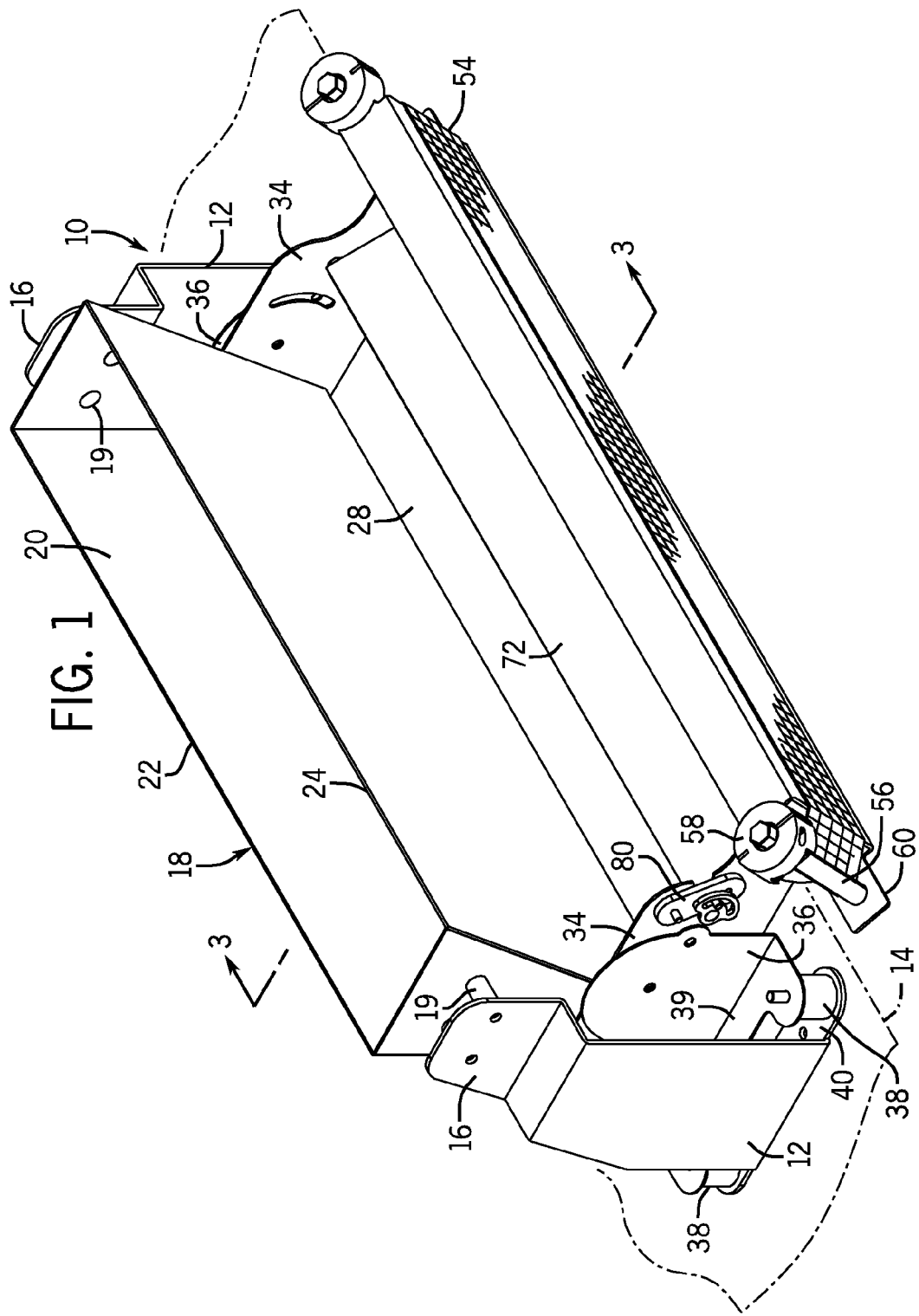
FIG. 1 is a top perspective view of a food topping device constructed in accordance with the present disclosure.
Figure 3:
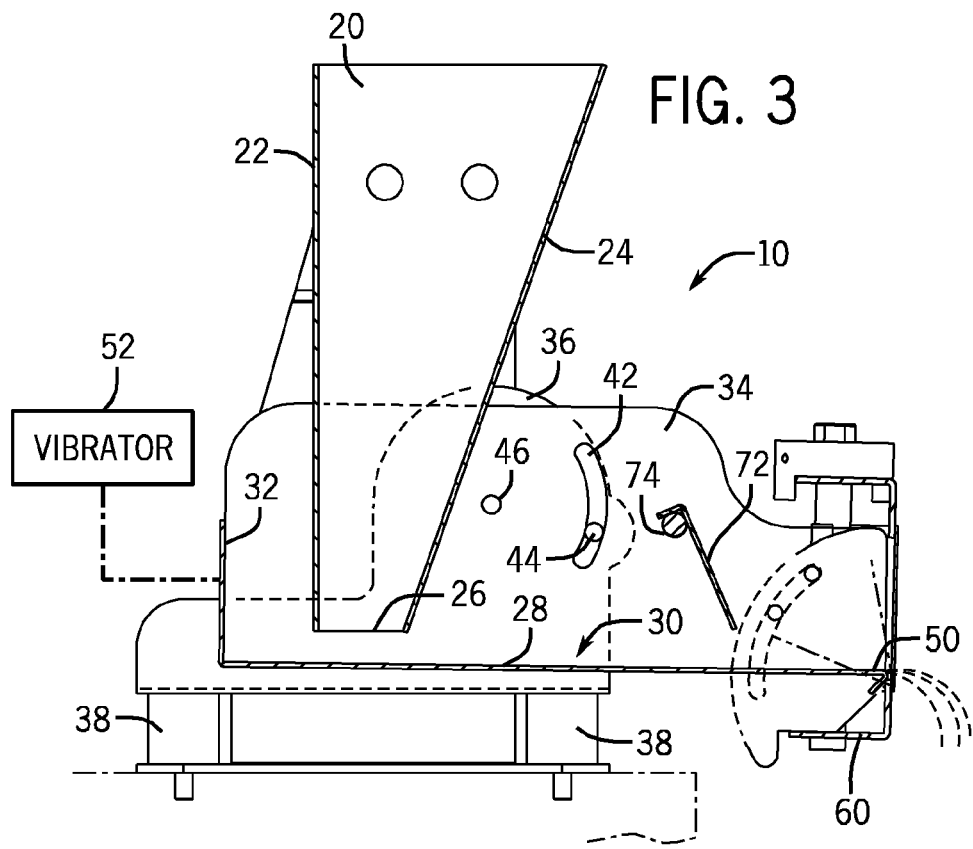
FIG. 3 is a side view of the food topping device in a home position.

FIG. 1 illustrates a food topping device 10 constructed in accordance with the present disclosure. The food topping device 10 dispenses a fine, non-viscous granular food topping, such as flour, powdered sugar, crystallized sugar, or a similar topping onto a food product as the food product moves beneath the food topping device. The food products can be individual items that move beneath the device 10 or could be a stream of products that pass beneath the device 10. As illustrated in FIG. 1, the food topping device 10 includes a pair of spaced side mounting brackets 12 that are each shown connected to a machine support 14. Each of the mounting brackets 12 includes a hopper support portion 16 that is securely connected to a hopper 18 by a pair of supports 19. The hopper 18 includes an open interior 20 defined by a generally vertical back wall 22 and a sloping front wall 24. The hopper 18 receives the food topping to be dispensed. When food topping is received within the hopper 18, the force of gravity causes the food topping to exit the hopper 20 through a discharge opening 26 (FIG. 3). The food topping dispensed from the discharge opening 26 contacts the base plate 28 of a discharge pan 30. The discharge pan 30 further includes a backwall 32 and spaced sidewalls 34, which are shown best in FIG. 1.

Referring to FIG. 1, a stationary pan mounting bracket 36 is securely mounted to each of the isolation pads 38 by a horizontal support flange 39. The isolation pads 38 in turn are mounted on top of a horizontal support portion 40 of the mounting brackets 12. The isolation pads 38 create a vibrational barrier between the pan mounting bracket 36 and the machine support 14.

Figure 4:
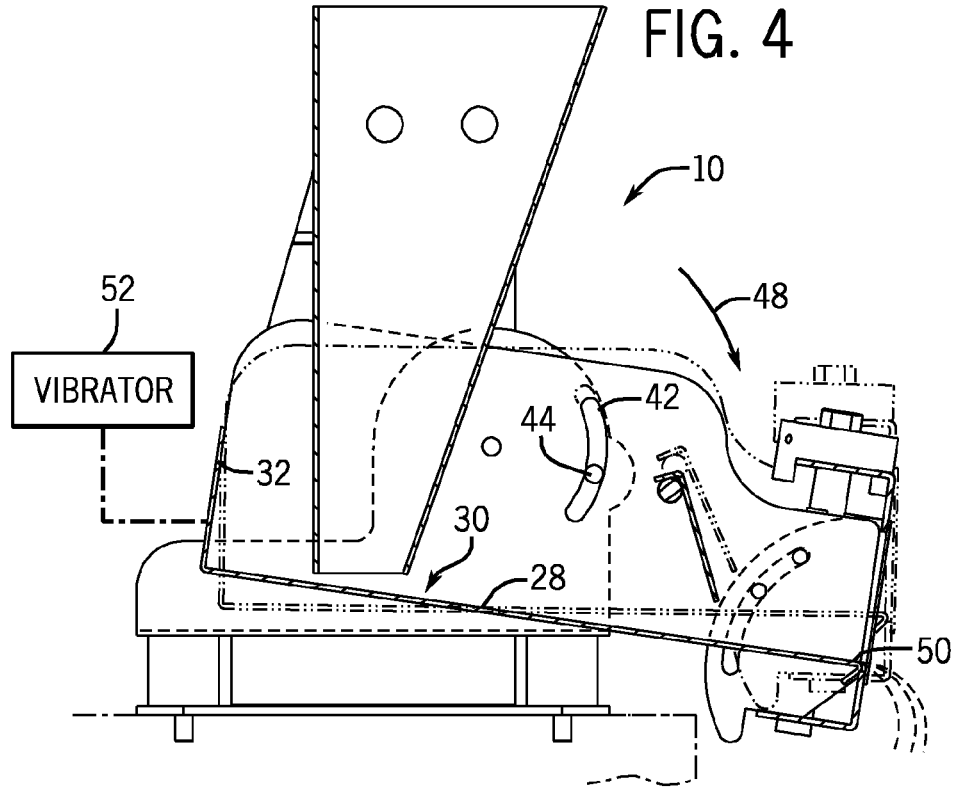
FIG. 4 is a view illustrating the rotational movement of the dispensing pan rotating from the home position of FIG. 3.

Referring again to FIGS. 3 and 4, the sidewalls 34 of the discharge pan 30 each include an arcuate adjustment slot 42 that receives a guide pin 44 formed on the pan mounting bracket 36. Each of the sidewalls 34 is rotatably mounted to the pan mounting bracket 36 at a pivot pin 46. Referring now to FIG. 4, the entire discharge pan 30 can be rotated in the direction shown by arrow 48 to increase the incline angle of the base plate 28 relative to horizontal. The increase in the angle of the base plate 28 relative to horizontal increases the amount of food topping device dispensed from a discharge end 50. It is contemplated that the incline angle of the base plate 28 can vary between a horizontal, minimum angle and a maximum angle relative to horizontal. Although the maximum angle can vary depending upon the type of material being dispensed, it is contemplated that the maximum angle should be slightly greater than the angle of repose to ensure that a food topping will flow toward the discharge end of the discharge pan 30. Alternatively, it is contemplated that the angle of the base plate 28 relative to horizontal could be fixed and selected at the most desired angle depending upon the type of material being dispensed.

As described above, the dispensing device 10 of the present disclosure is utilized for dispensing a granular material, such as flour, powdered sugar, granular sugar, cinnamon or other similar food toppings. The angle of repose is a property of granular material at the maximum angle of a stable slope which is determined by friction, cohesion and the shape of the particles being stacked. When bulk granular material is poured onto a horizontal surface, a conical pile will form and the angle between the surface of the pile and horizontal is known as the angle of repose. When the base plate 28 of the discharge pan 30 is rotated as indicated by arrow 48, the increase in the angle of the base plate 28 relative to horizontal will urge the granular material to flow along the sloped base plate 28.

As the discharge pan 30 rotates in the direction shown by arrow 48, the arcuate slot 42 moves with the sidewall 34 in the direction illustrated while the guide pin 44 moves within the arcuate slot 42.

In the embodiment shown in FIGS. 3 and 4, a vibration device 52 is positioned in physical contact with the backwall 32 of the discharge pan 30. In one embodiment, the vibration device 52 can be a mechanically operated device that, when placed in contact with the backwall 32, causes the entire discharge pan 30 to vibrate.

Although various different types of mechanical devices are contemplated as being useful as the vibration device, it is contemplated that the vibration device will be oscillating at a frequency of 3 kHz or higher to provide the adequate vibration to the discharge pan 30. As an example, the vibration device could be an electrically operated motor that has an offset weighting system to introduce vibration onto the discharge pan 30.

The vibration of the discharge pan 30 causes the food topping to slide down the base plate 28 toward the discharge end 50. When the vibration device 52 is activated, the constant vibration of the base plate 28 causes the food product being dispensed to overcome the angle of repose for the product. Thus, when the vibration device 52 is activated, the food topping slides down the inclined base plate 28 toward the discharge end 50. When the vibration device 52 is turned off, the food topping immediately discontinues flow such that discharge from the discharge end 50 is immediately terminated. Thus, the timing of the discharge of the food topping can be accurately controlled by controlling the operation of the vibration device 52. The selective activation and deactivation of the vibration device 52 accurately controls the discharge of the food topping from the discharge end 50.

Referring now to FIG. 1, the discharge end of the food topping device 10 includes a screen 54 mounted between a pair of take-up shafts 56. Each take-up shaft 56 includes a collar 58. Each take-up shaft 56 is rotatable within a base plate 60. The base plate 60 in turn is connected to a side plate 62. The side plate 62 includes a curved slot 64 and receives a pair of guide pins 66. As illustrated in FIG. 6, the entire screen assembly 68 can be pivoted in the direction shown by arrow 70 to increase the discharge rate through the screen 54. Specifically, as the angle of the screen changes as the screen assembly 68 moves in the direction shown by arrow 70, the size of the individual holes in the screen decreases, which slows the rate of discharge of the food topping from the food topping device 10. Although the disclosure illustrates the ability of the screen assembly 68 to be adjusted relative to the stationary base plate 28 of the discharge pan 30, it is contemplated that the angle of the entire screen assembly 68, and thus the angle of the screen 54, could be fixed relative to the base plate 28. It has been determined that the angle of the screen 54 relative to the base plate 28 is most effective when the angle is greater than 90°. However, it is contemplated that the angle between the screen 54 and the base plate 28 could be selected from various different angles depending upon the desired discharge characteristics of the food topping.

The screen 54 that forms part of the screen assembly 68 can have a series of openings formed in many different shapes, sizes or patterns. In one embodiment, the screen has a series of generally square openings formed by a wire mesh grid. However, it is contemplated that the screen could include other size or shaped openings depending upon the desired pattern of food topping to be dispensed onto the food product. Additionally, the screen could be replaced with a screen having blocking sections to prevent food topping from flowing past the screen in certain areas. Since the screen 54 is mounted to the take-up shafts 56, the screen 54 can be easily replaced as desired.

As can be understood in the Figures, the pivoting of the screen assembly 68 is independent of the pivoting of the discharge pan 30. Thus, the angle of the screen assembly 68 relative to the base plate 28 of discharge pan 30 can be adjusted independently of the adjustment of the discharge pan 30 relative to horizontal. In one contemplated embodiment, the angle of the screen assembly 68 relative to the base plate 28 can be fixed at the most desirable angle. The compound angle created by the angle of the discharge pan 30 relative to horizontal and the angle of the screen 54 of the screen assembly 68 relative to the base plate 28 creates desirable flow characteristics for dispensing the food topping onto food products.

Referring back to FIG. 1, the food topping device 10 further includes a flow plate 72 that extends across the width of the base plate 28. As illustrated in FIG. 3, the flow plate 72 is mounted to a rod 74 such that the flow plate 72 can rotate in the direction shown by arrow 76 in FIG. 5. As the flow plate 72 rotates in the direction shown by arrow 76, the distance between the lower end 78 and the base plate 28 decreases. The distance between the lower end 78 and the base plate 28 controls the thickness of the food topping that flows toward the discharge end 50. In this manner, the rotation of the flow plate 72 can control the amount of food topping discharged by the food topping device 10.

Referring back to FIG. 1, the flow plate 72 is mounted between the pair of spaced sidewalls 34 and the rotation of the flow plate 72 is controlled by a rotation bracket 80. The rotation bracket 80 controls the rotational movement of the flow plate 72 about the rod 74.

Figure 2:
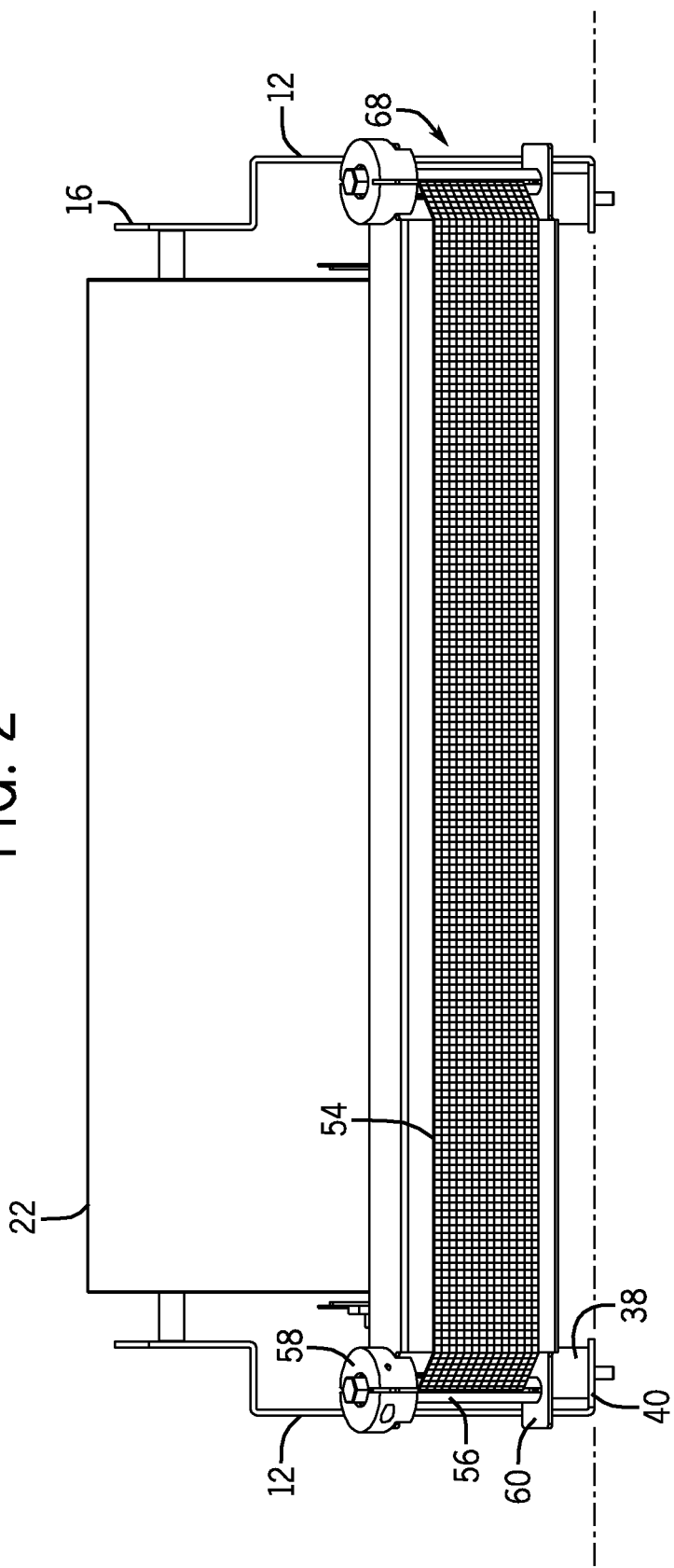
FIG. 2 is a front view of the food topping device.

In the embodiment shown in FIGS. 1 and 2, the screen 54 includes a series of generally square openings uniformly distributed over the length of the screen 54. However, it is contemplated that other opening shapes could be utilized while operating within the scope of the present disclosure. Further, the openings formed in the screen 54 could vary from the bottom of the screen to the top of the screen depending upon the discharge characteristics required for the food topping device.

As described above, the food topping device 10 is configured such that the angle of the base plate 28 can be adjusted relative to horizontal. Likewise, the angle of the flow plate 72 and the angle of the screen 54 can each be adjusted independently to modify the flow characteristics of food topping from the food topping device 10. Various different devices can be utilized to control the angle of the various components of the food topping device 10. However, the independent adjustment of these various components allows a user to control the operation of the food processing device in many different manners.

The vibration device 52 shown in the drawing figures is shown schematically since various different components could be utilized while operating within the scope of the present disclosure. Preferably, the vibration device 52 can be selectively activated and deactivated to accurately control the discharge of the food topping device from the food topping device 10. It is contemplated that various different types of mechanical devices could be utilized while operating within the scope of the present disclosure.

I claim:

1. A food topping device for dispensing a food topping onto a food product, comprising:
    a hopper having an open interior sized to receive a supply of the food topping to be dispensed and a discharge opening;
    a discharge pan positioned beneath the hopper to receive the food topping from the discharge opening, the discharge pan being positioned at an incline angle relative to horizontal and extending from a discharge end to a back end;
    a vibration device positioned in contact with the discharge pan to selectively vibrate the discharge pan; and
    a screen assembly positioned at the discharge end of the discharge pan to control the discharge of the food topping from the discharge end, wherein the screen assembly includes a screen extending across the width of the discharge pan and being sized to allow a food topping to pass therethrough.

2. The food topping device of claim 1 wherein the discharge pan is pivotally mounted such that the incline angle of the discharge pan is adjustable.

3. The food topping device of claim 2 wherein the vibration device is selectively activated to control the discharge of the food topping from the discharge end of the discharge pan.

4. The food topping device of claim 1 wherein the incline angle of the discharge pan is selectable between a horizontal position and a maximum incline angle.

5. The food topping device of claim 2 further comprising a flow plate positioned between the hopper and the discharge end of the discharge pan, the flow plate having a lower end spaced from a base plate of the discharge pan to control the flow of the food topping from the hopper to the discharge end.

6. The food topping device of claim 5 wherein the spacing between the lower end of the flow plate and the base plate is adjustable.

7. The food topping device of claim 4 wherein the maximum incline angle is greater than the angle of repose for the food topping.

8. A food topping device for dispensing a food topping onto a food product, comprising:
    a hopper having an open interior sized to receive a supply of the food topping to be dispensed and a discharge opening;
    a discharge pan positioned beneath the hopper to receive the food topping from the discharge opening, the discharge pan being positioned at an incline angle relative to horizontal and extending from a discharge end to a back end;
    a screen assembly positioned at the discharge end of the discharge pan to control the discharge of the food topping from the discharge end, wherein the screen assembly includes a screen extending across the width of the discharge pan and sized to allow the food topping to pass therethrough, wherein the screen assembly is pivotable relative to the discharge pan to modify the angle of the screen relative to the discharge pan; and
    a vibration device positioned in contact with the discharge pan to selectively vibrate the discharge pan.

9. The food topping device of claim 8 wherein the discharge pan is pivotally mounted to a stationary mounting bracket such that the incline angle of the discharge pan relative to horizontal is adjustable.

10. The food topping device of claim 9 wherein the vibration device is selectively activated to control the discharge of the food topping from the discharge end of the discharge pan.

11. The food topping device of claim 9 further comprising a flow plate positioned between the hopper and the discharge end of the discharge pan, the flow plate having a lower end spaced from a base plate of the discharge pan to control the flow of the food topping from the hopper to the discharge end.

12. The food topping device of claim 11 wherein the spacing between the lower end of the flow plate and the base plate is adjustable.

13. The food topping device of claim 9 wherein the angle of the screen assembly and the incline angle of the discharge pan are independently adjustable.

14. The food topping device of claim 9 wherein the mounting bracket is mounted to a support surface through a vibration isolation device.

15. A method of dispensing a food topping onto a food product, comprising the steps of:

filling a hopper with a supply of the food topping, the hopper being positioned above a discharge pan having a discharge end;

adjusting the incline angle of the discharge pan relative to horizontal such that the food topping does not flow past the discharge end due to the force of gravity;

positioning a screen assembly having a screen that extends across the entire width of the discharge pan at the discharge end of the discharge pan to control the amount of food topping dispensed; and operating a vibration device to vibrate the discharge pan, wherein when the discharge pan is vibrating, the food topping flows along the discharge pan and past the discharge end.

16. The method of claim 15 further comprising the step of terminating the operation of the vibration device to discontinue the flow of food topping past the discharge end.

17. The method of claim 15 further comprising the step of adjusting the angle of the screen assembly relative to the discharge pan.

* * * * *